2,601,575

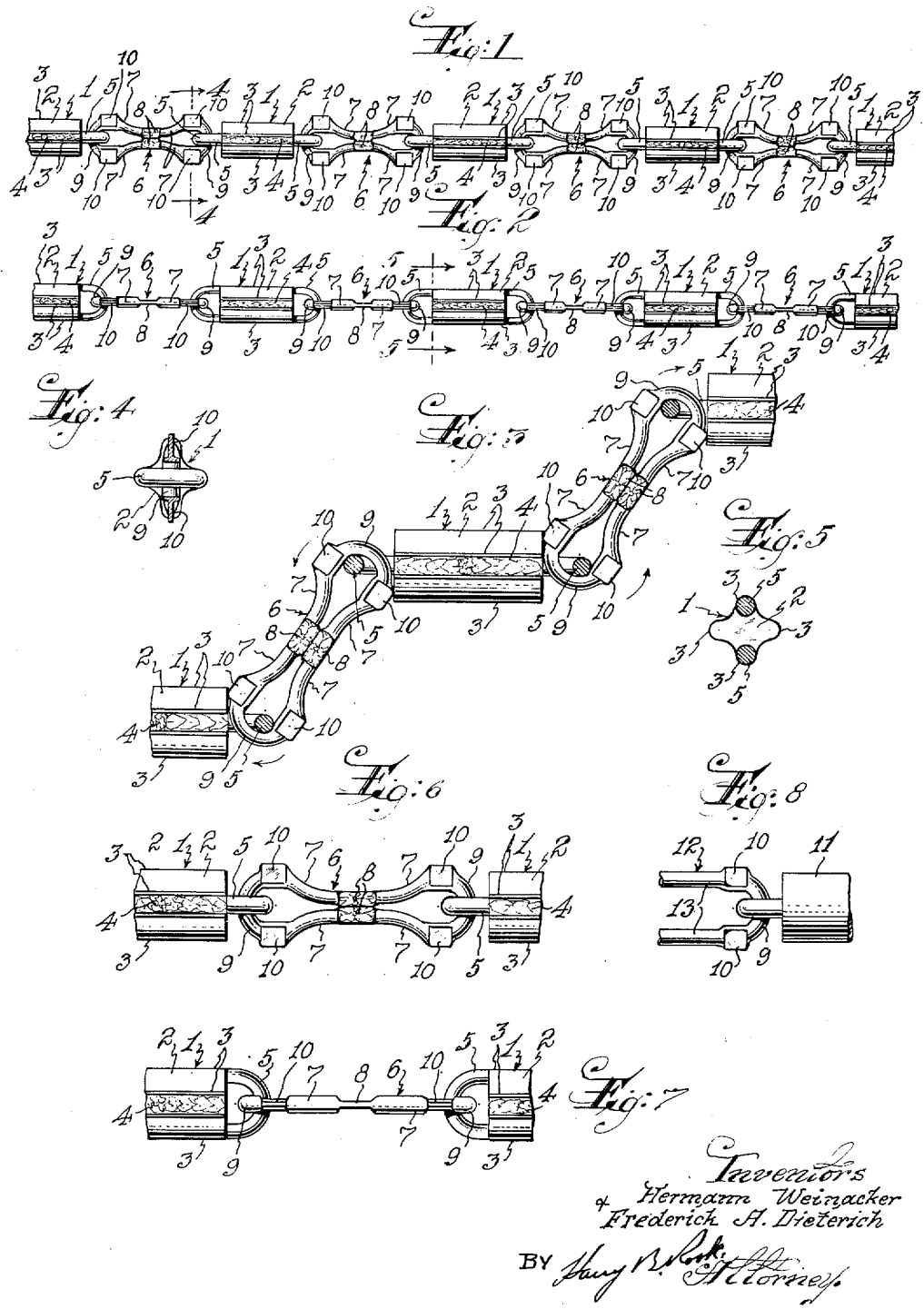
June 24, 1952  H. WEINACKER ET AL  2,601,575
ANTIKINK ORNAMENTAL CHAIN
Filed Nov. 3, 1949
Inventors
Hermann Weinacker
Frederich A. Dieterich Patented June 24, 1952

UNITED STATES PATENT OFFICE 2,601,575

ANTIKINK ORNAMENTAL CHAIN

Hermann Weinacker, Short Hills, and Frederick A. Dieterich, Maplewood, N. J., assignors to Universal Chain Co. Inc., Maplewood, N. J., a corporation of Rhode Island Application November 3, 1949, Serial No. 125,196

2 Claims. (Cl. 59—80)

This invention relates to an ornamental chain for personal wear consisting of a series of links flexibly joined together, and has for its prime object simple and effective means for preventing kinking or entanglement of the links of the chain.

Another object of the present invention is to provide a flexible chain of this kind in which the links cannot become kinked, pinched or caught in the corners at one or the other of the junctures of the links when the chain is laid down or placed in a pile on a horizontal supporting surface.

Yet another object of the invention is to provide a chain of this type that is attractive in appearance and sturdy in use.

Still another object of the invention is to provide a chain of this type in which the parts of alternative links are duplicates one of the other thus providing a chain which may be made in quantities at a minimum cost.

Other objects and advantages of the invention will be apparent from the description thereof to follow taken in connection with the accompanying drawing in which:

Figure 1 is a top plan view of a fragment of a chain embodying the invention.

Figure 2 is a side view thereof.

Figure 3 is an enlarged fragmentary top plan view showing the maximum angular displacement the links can assume relative to each other.

Figure 4 is a vertical sectional view taken on the plane of the line 4—4 of Figure 1.

Figure 5 is a vertical sectional view taken on the plane of the line 5—5 of Figure 2.

Figure 6 is an enlarged plan view of one of the links.

Figure 7 is a side view of the link of Figure 6.

Figure 8 is a fragmentary top plan view showing modified forms of links.

In the construction of ornamental chains for personal wear such as watch chains, key chains and the like, it is desirable to provide a construction in which the links are flexibly joined but which may be laid down on a supporting surface without becoming kinked or entangled. In order to accomplish this we have provided a chain of two different constructions of links arranged with one construction alternating with the other throughout the chain. The constructions have coacting parts for limiting their relative angular displacement.

Referring to the drawing, 1 designates a link of one construction comprising a solid bar 2 substantially cylindrical in cross-section with four opposed bulging side portions 3, the outer surfaces of which may be decorated as indicated at 4. The ends of two opposed bulging sides at each end of the bar terminate in a loop 5 forming an extension of the bar, said loop 5 and the end of the bar 2 forming in effect a closed loop or ring. The link 1 may be cut from bar stock and suitably shaped or formed in any other suitable manner.

The second construction of link designated 6 is so formed as to join the links 1 together and alternate therewith throughout the series of links of the chain. This second construction comprises an elongated loop formed of wire or strip material having side walls 7 curved inwardly and touching at their central portions, which portions may be flattened and decorated as indicated at 8. The side walls gracefully curve outwardly away from each other terminating in end loops 9 which are interlinked with the looped extensions 5. Adjacent their ends, the side walls are formed with opposed enlarged portions preferably of substantially square shape and flattened as indicated at 10. These enlarged flattened portions extend laterally of the side walls, one at each side of and in closely spaced relation to the corresponding looped extension and the distance from the outer edge of each flattened portion to the inner edge of the adjacent side wall 7 is greater than the distance between the end of the bar 2 and the peak or the most distant point on the inner surface of the adjacent loop extension 5 of said bar so that the enlarged portions 10 cannot pass through the spaces provided by the loop extensions 5 when the looped ends 9 of links 6 and the loop extensions 5 of the links 1 are interlinked as shown in the drawing.

When a chain embodying the links 1 and 6 is promiscuously or carelessly laid or piled on a horizontal supporting surface, the looped ends of the links only slide a limited distance upon each other, the engagement of the corners of the enlarged portions 10 with the end edges of the bars 2 as shown in Figure 3 forming a positive stop between the links thereby preventing further sliding movement. The maximum angular displacement of the links is shown in Figure 3 and it will be observed that the links cannot become kinked, pinched or entangled with each other.

In the modification of the invention shown in Figure 8, the link 11 is cylindrical in cross-section without any bulging sides, and the link 12 has straight side walls 13 instead of the inwardly curved side walls 7 of the form of Figure 1. The link 11 may be tubular if desired.

From the foregoing it will be seen that we have provided a simple construction of flexible ornamental chain in which the links cannot become kinked and in which the parts of alternative links are duplicates one of the other thus providing a chain which may be made in quantities at a minimum cost.

Changes in details might be made without departing from the principle of the invention.

What is claimed is:

1. An anti-kink chain comprising a plurality of links each having a closed loop at each end, and a plurality of elongated links formed of wire each having an end loop interlinked with one of said closed loops, intermediate portions of said end loops being flattened to provide an enlargement at each of opposite sides of and in closely spaced relation to the corresponding closed loop, said enlargements being of such dimensions that they cannot slip through said closed loops, thereby limiting sliding of said closed loops longitudinally of said elongated links so as to prevent kinking of the chain.

2. An anti-kink ornamental chain comprising alternate solid links and elongated links formed of wire, said solid links each comprising a bar having end surfaces and looped end extensions beyond the respective end surfaces forming a closed loop at each end of each solid link, each of said elongated links having an end loop interlinked with one of said closed loops, and intermediate portions of each end loop having a flattened portion extending outwardly to provide an enlargement at each of opposite sides of and in closely spaced relation to the corresponding closed loop, said enlargements being of such dimensions that they cannot slip into said closed loops, thereby limiting sliding of said closed loops longitudinally of said elongated links so as to prevent kinking of the chain.

HERMANN WEINACKER.
FREDERICK A. DIETERICH.

REFERENCES CITED

The following references are of record in the file of this patent:

UNITED STATES PATENTS

| Number | Name | Date |
|---|---|---|
| 253,203 | Harris | Feb. 7, 1882 |
| 1,655,122 | Andrews | Jan. 3, 1928 |

FOREIGN PATENTS

| Number | Country | Date |
|---|---|---|
| 477,076 | Germany | May 8, 1929 |